(12) United States Patent
Hamlin et al.

(10) Patent No.: US 10,134,284 B1
(45) Date of Patent: Nov. 20, 2018

(54) PARKING ALARM ASSEMBLY

(71) Applicants: Justin Hamlin, Fairless Hills, PA (US); Lois Ubriaco, Fairless Hills, PA (US)

(72) Inventors: Justin Hamlin, Fairless Hills, PA (US); Lois Ubriaco, Fairless Hills, PA (US)

( * ) Notice: Subject to any disclaimer, the term of this patent is extended or adjusted under 35 U.S.C. 154(b) by 0 days.

(21) Appl. No.: 15/696,654

(22) Filed: Sep. 6, 2017

(51) Int. Cl.
*G08G 1/16* (2006.01)
*G08G 1/14* (2006.01)

(52) U.S. Cl.
CPC .................... *G08G 1/168* (2013.01)

(58) Field of Classification Search
CPC ............ A44B 11/2511; A44B 11/2569; B60Q 2900/30; B60Q 9/00; B60Q 9/006; B60Q 9/007; G01S 15/931; G08B 21/02
USPC ... 340/932.2, 309.16, 5.32, 436, 988, 686.1, 340/933, 435, 309.15, 322, 332, 942, 340/545.1, 693.11
See application file for complete search history.

(56) References Cited

U.S. PATENT DOCUMENTS

| | | | | |
|---|---|---|---|---|
| 2,454,896 A | | 11/1948 | Traub | |
| 3,261,321 A | | 7/1966 | Mandl | |
| 3,820,065 A | * | 6/1974 | Koplewicz | E04H 6/426 340/932.2 |
| 4,074,269 A | * | 2/1978 | Hartley | G08B 13/22 340/5.32 |
| D260,860 S | | 9/1981 | Doman | |
| 4,288,777 A | * | 9/1981 | Luik | B60Q 1/48 200/19.05 |
| 5,227,785 A | * | 7/1993 | Gann | B60Q 1/48 116/203 |
| 6,154,150 A | * | 11/2000 | Laubach | E04H 6/426 340/309.16 |
| 6,814,023 B1 | * | 11/2004 | Foster | E04H 6/426 116/28 R |
| 2005/0156758 A1 | * | 7/2005 | Gilliss | G08G 1/164 340/932.2 |
| 2014/0052342 A1 | * | 2/2014 | Seibert | B60N 2/002 701/45 |
| 2017/0080858 A1 | * | 3/2017 | Dotson | B60Q 9/006 |

* cited by examiner

*Primary Examiner* — Daniel Previl

(57) ABSTRACT

A parking alarm assembly for assisting with parking a vehicle in a garage includes an alarm unit that may be coupled to a wall in a garage. The alarm unit selectively emits an audible alarm. A pole is pivotally coupled to the alarm unit. The pole extends between the alarm unit and a windshield of a vehicle when the vehicle is parked in the garage. A pad is coupled to the pole and engages the windshield when the vehicle is parked in the garage. The alarm unit emits the audible alarm when the pad contacts the windshield to notify a driver of the vehicle to stop.

10 Claims, 5 Drawing Sheets

PARKING ALARM ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to alarm devices and more particularly pertains to a new alarm device for assisting with parking a vehicle in a garage.

BRIEF SUMMARY OF THE INVENTION

An embodiment of the disclosure meets the needs presented above by generally comprising an alarm unit that may be coupled to a wall in a garage. The alarm unit selectively emits an audible alarm. A pole is pivotally coupled to the alarm unit. The pole extends between the alarm unit and a windshield of a vehicle when the vehicle is parked in the garage. A pad is coupled to the pole and engages the windshield when the vehicle is parked in the garage. The alarm unit emits the audible alarm when the pad contacts the windshield to notify a driver of the vehicle to stop.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
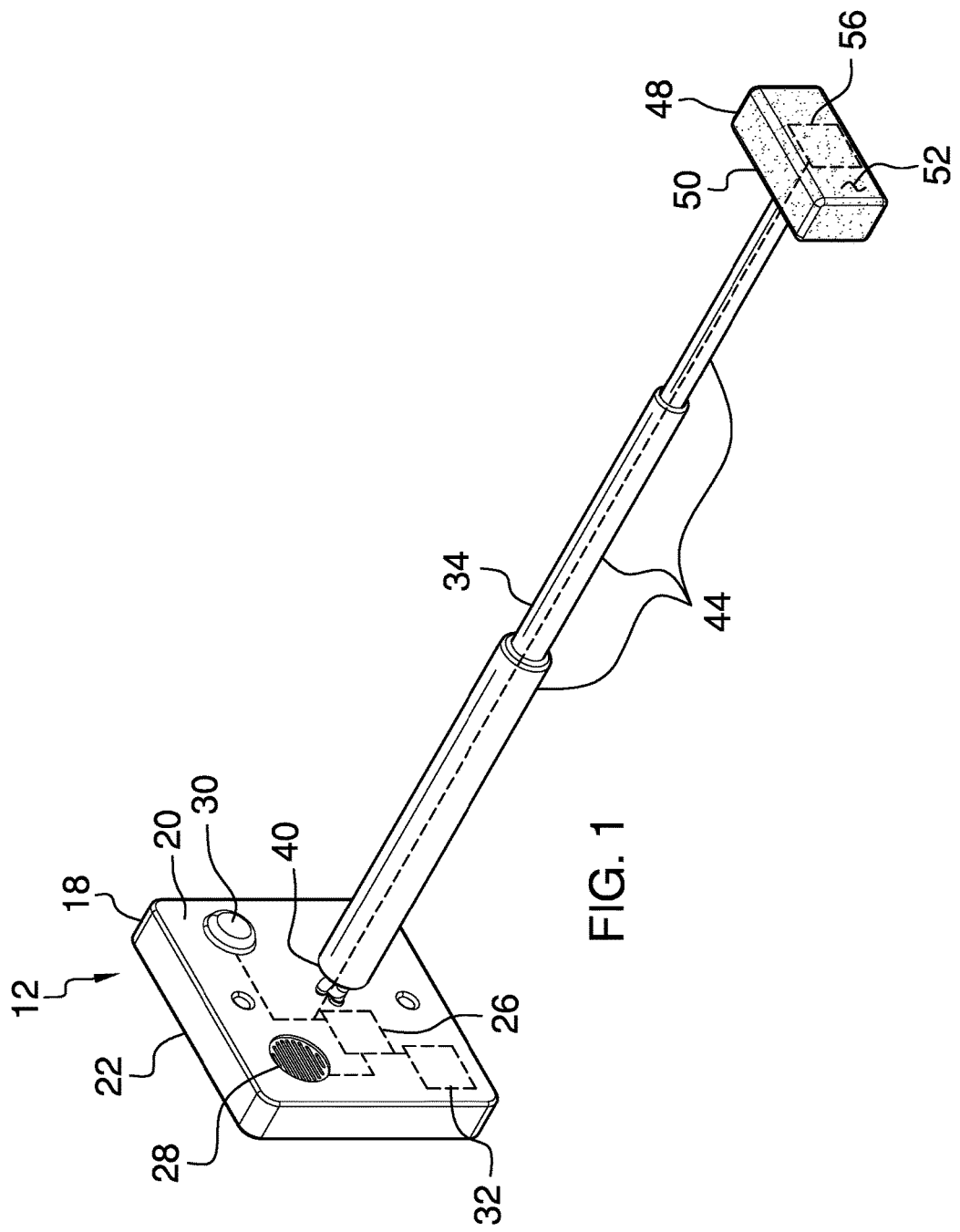
FIG. 1 is a top perspective view of a parking alarm assembly according to an embodiment of the disclosure.
Figure 2:
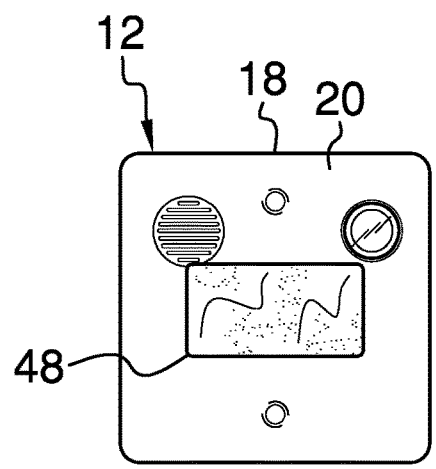
FIG. 2 is a front view of an embodiment of the disclosure.
Figure 3:
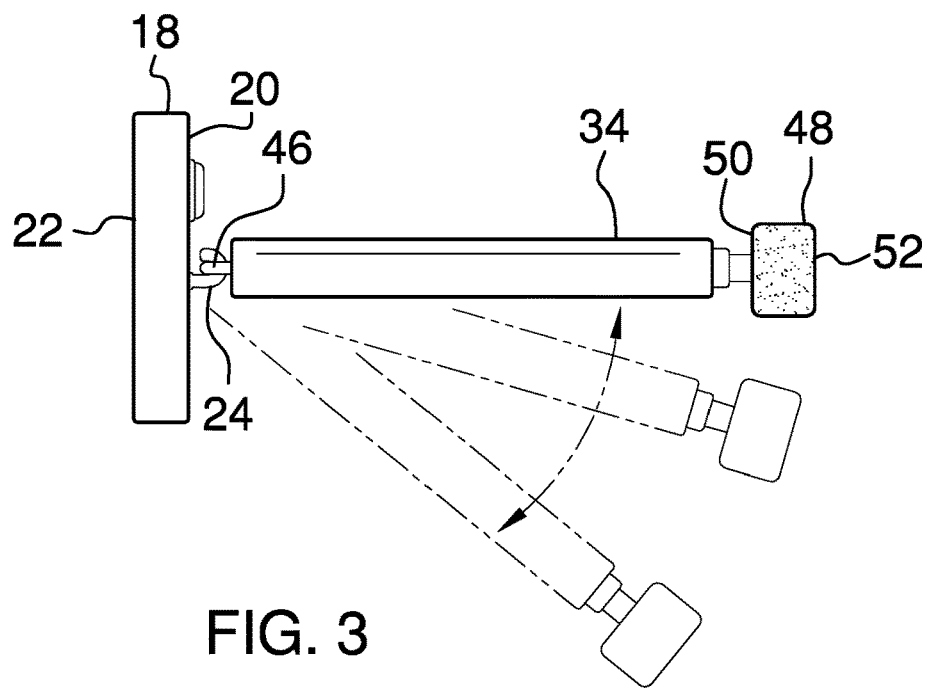
FIG. 3 is a right side view of an embodiment of the disclosure.
Figure 4:
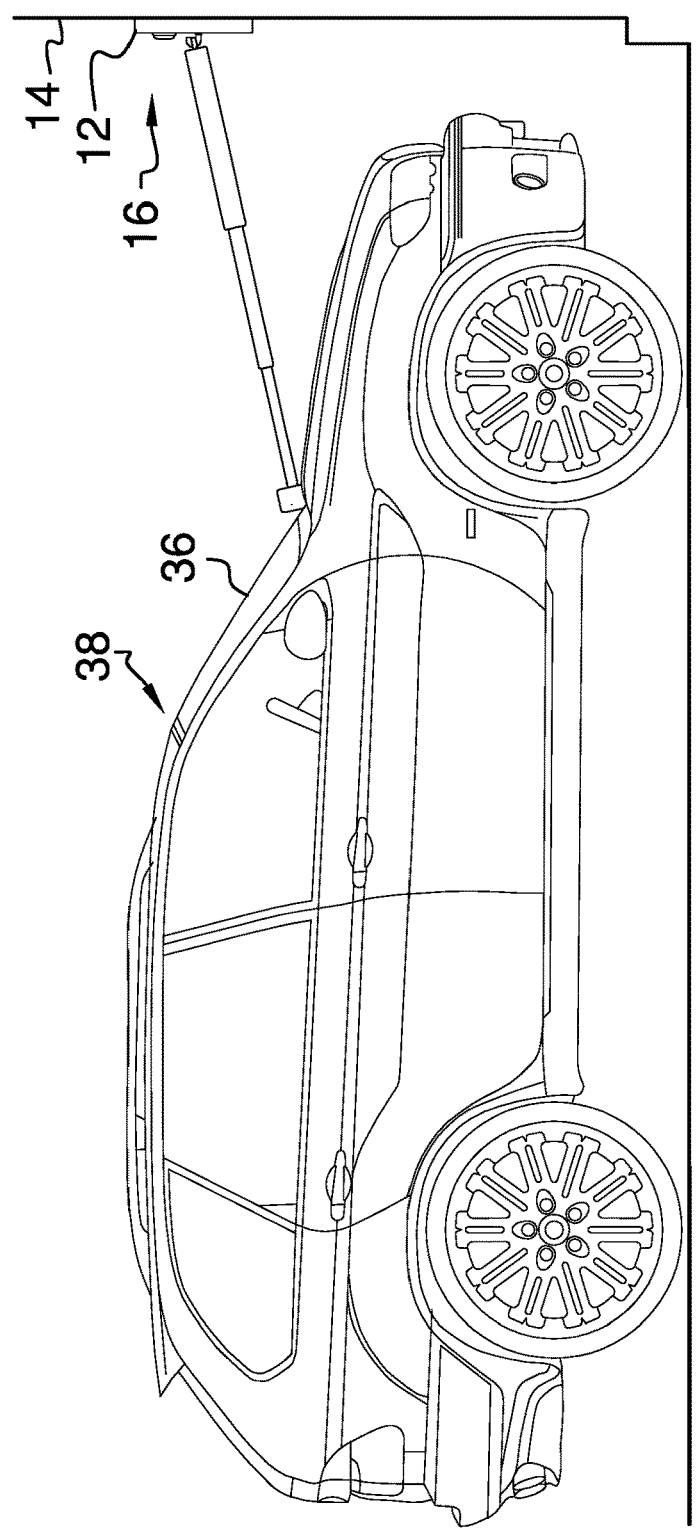
FIG. 4 is a perspective in-use view of an embodiment of the disclosure.
Figures 5, 6:
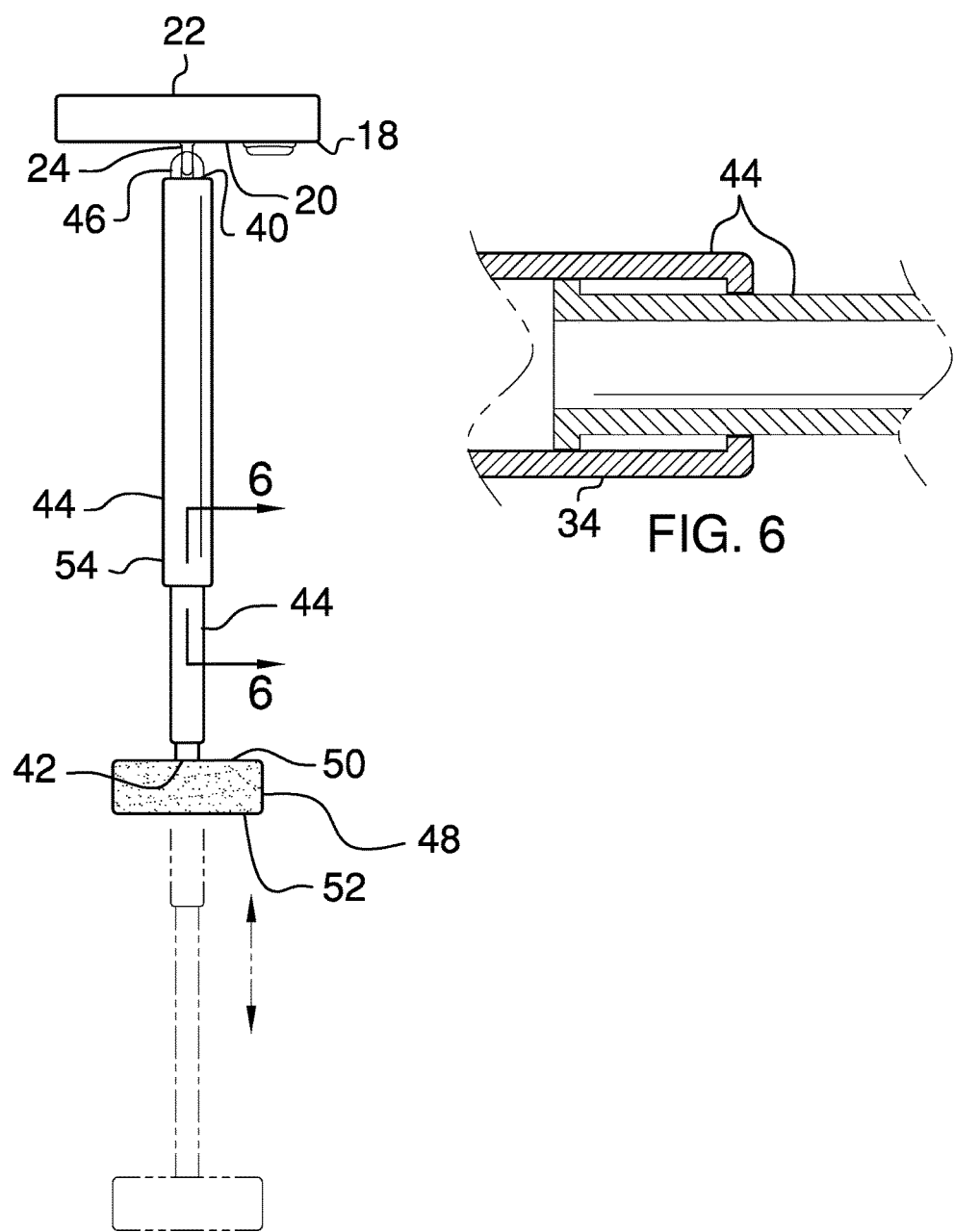
FIG. 5 is a right side perspective view of an embodiment of the disclosure.
FIG. 6 is a cross sectional view taken along line 6-6 of FIG. 5 of an embodiment of the disclosure.

With reference now to the drawings, and in particular to FIGS. 1 through 7 thereof, a new alarm device embodying the principles and concepts of an embodiment of the disclosure and generally designated by the reference numeral 10 will be described.

As best illustrated in FIGS. 1 through 7, the parking alarm assembly 10 generally comprises an alarm unit 12 that may be coupled to a rear wall 14 in a garage 16. The alarm unit 12 selectively emits an audible alarm. The alarm unit 12 comprises a housing 18 that has a front wall 20 and a back wall 22. The back wall 22 of the housing 18 is coupled to the rear wall 14 in the garage 16. A coupler 24 is coupled to the front wall 20 of the housing 18.

A processor 26 is positioned within the housing 18 and the processor 26 selectively generates an alarm sequence. A speaker 28 is coupled to the front wall 20 of the housing 18 to selectively emit an audible alarm outwardly therefrom. The speaker 28 is turned on when the processor 26 generates the alarm sequence. The speaker 28 may be an electronic speaker 28 or the like.

A light emitter 30 is coupled to the front wall 20 of the housing 18 to selectively emit light outwardly therefrom. The light emitter 30 is turned on when the processor 26 generates the alarm sequence. Moreover, the light emitter 30 may comprise an LED or the like. A power supply 32 is positioned within the housing 18 and the power supply 32 is electrically coupled to the processor 26. The power supply 32 comprises at least one battery.

A pole 34 is pivotally coupled to the alarm unit 12 to extend between the alarm unit 12 and a windshield 36 of a vehicle 38 being parked in the garage 16. The vehicle 38 may be a passenger vehicle, a cargo vehicle and any other vehicle commonly parked in a garage 16. The pole 34 has a first end 40 and a second end 42. Additionally, the pole 34 has a plurality of sections 44 that are slidably coupled together such that the pole 34 has a telescopically adjustable length.

A receiver 46 is coupled to the first end 40 of the pole 34 and the receiver 46 pivotally engages the coupler 24 to pivotally retain the pole 34 on the housing 18. Each of the coupler 24 and the receiver 46 may be mechanical fasteners mated together to form a pivotable connection. A pad 48 is coupled to the pole 34 and the pad 48 engages the windshield 36 when the vehicle 38 is parked in the garage 16. The alarm unit 12 emits the audible alarm when the pad 48 contacts the windshield 36. In this way the alarm unit 12 notifies a driver of the vehicle 38 to stop. Thus, the vehicle 38 is inhibited from striking objects in the garage 16 and the rear wall 14 of the garage 16. Additionally, the alarm unit 12 ensures the garage door will clear the vehicle 38 when the garage door is closed.

The pad 48 has a first surface 50 and a second surface 52. The first surface 50 is coupled to the second end 42 of the pole 34 and the second surface 52 abuts the windshield 36. Indicia may be printed on the second surface 52 of the pad 48. The indicia may comprise the words "stop car now" or the like. Additionally, the pad 48 is comprised of a resiliently compressible material such as rubber or the like. Thus, the pad 48 is inhibited from damaging the windshield 36 when the pad 48 abuts the windshield 36.

A sensor 56 is coupled to the pad 48 to sense when the pad 48 abuts the windshield 36. The sensor 56 is electrically coupled to the processor 26. Moreover, the processor 26 generates the alarm sequence when the sensor 56 senses the pad 48 abuts the windshield 36. The sensor 56 may be a pressure sensor or the like that is capable of sensing contact between the pad 48 and the windshield 36.

Figure 7:
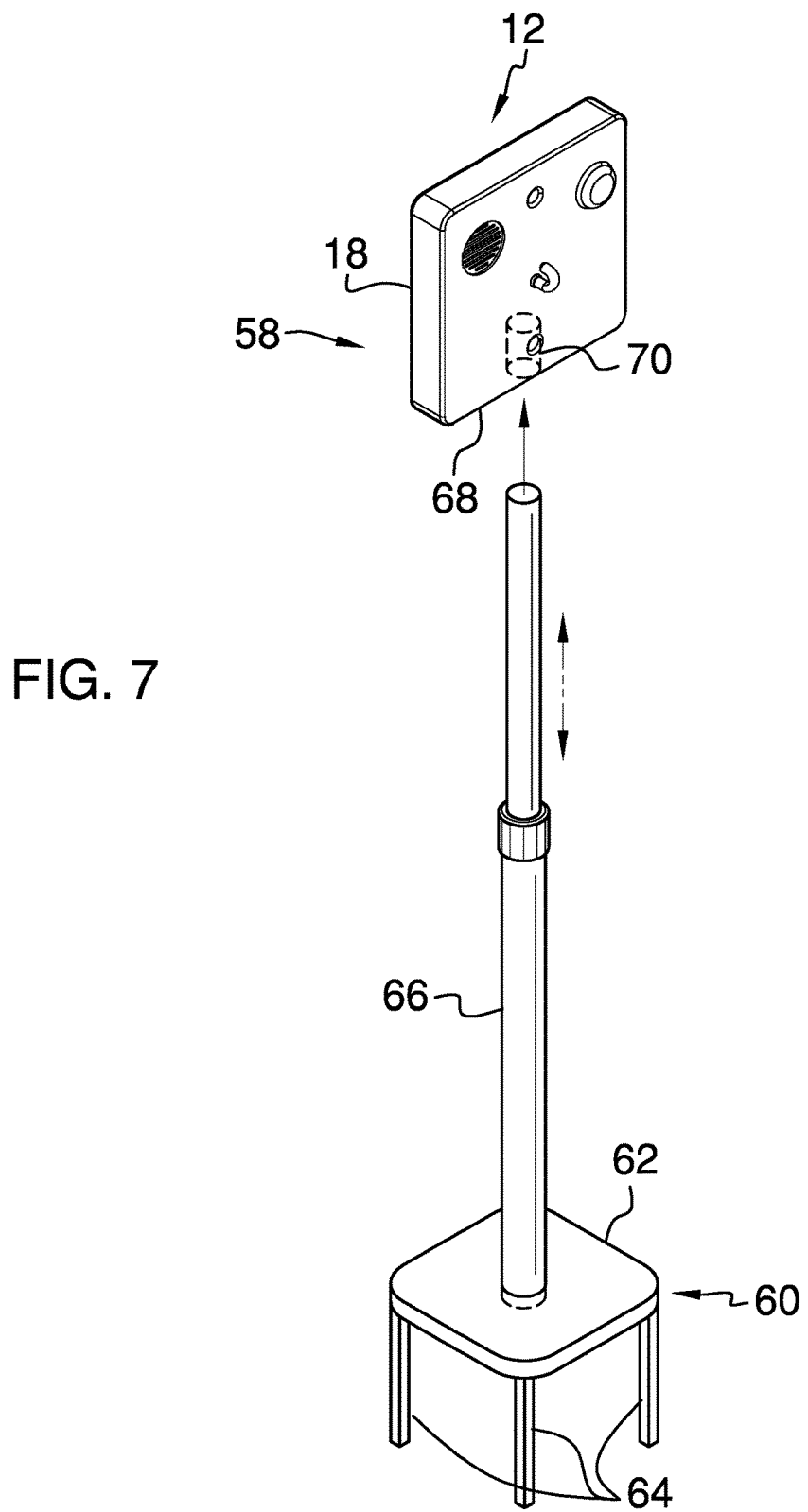
FIG. 7 is a perspective view of an alternative embodiment of the disclosure.

In an alternative embodiment 58 as shown in FIG. 7, a stand 60 may be provided that has a platform 62 and a plurality of legs 64. Each of the legs 64 may abut a floor of the garage 16 and a shaft 66 may be coupled to and extend upwardly from the platform 62. The housing 18 may have a bottom side 68 and the bottom side 68 may have a well 70 extending therein. The well 70 may insertably receive the shaft 66 such that the housing 18 is spaced from the floor in lieu of being coupled to the rear wall 14.

In use, housing 18 is coupled to the rear wall 14 of the garage 16. The pole 34 is manipulated to a selected length and the pole 34 is manipulated to a selected angle with respect to the housing 18. In this way the pad 48 is positioned a selected distance from the rear wall 14 of the garage 16. Moreover, the pad 48 is positioned such that a front end of the car does not contact the rear wall 14 of the garage 16 when the pad 48 abuts the windshield 36. The vehicle 38 is driven into the garage 16 until the pad 48 abuts the windshield 36. The processor 26 generates the alarm sequence, the speaker 28 emits the audible alarm and the light emitter 30 emits the light when the pad 48 abuts the windshield 36. In this way the driver is notified to stop the vehicle 38. Thus, the vehicle 38 is fully parked in the garage 16 without striking the garage 16 and objects that may be stored in the garage 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A parking alarm assembly being configured to communicate when a vehicle is fully positioned in a garage, said parking alarm assembly comprising:
    an alarm unit being configured to be coupled to a wall in a garage, said alarm unit selectively emitting an audible alarm, said alarm unit comprising a housing having a front wall and a back wall, said back wall being configured to be coupled to the wall;
    a pole being pivotally coupled to said alarm unit wherein said pole is configured to extend between said alarm unit and a windshield of a vehicle being parked in the garage, said pole having a first end and a second end, said first end being coupled to said front wall of said housing and said pole extending forwardly from said front wall wherein said second end of said pole is extended away from said housing, said pole having a plurality of sections being slidably coupled together such that said pole has a telescopically adjustable length, said pole being pivotally coupled to said housing;
    a pad being coupled to said second end of said pole wherein said pad is configured to engage the windshield when the vehicle is parked in the garage, said alarm unit emitting said audible alarm when said pad contacts the windshield wherein said alarm unit is configured to notify a driver of the vehicle to stop; and
    a sensor being coupled to said pad wherein said sensor is configured to sense when said pad abuts the windshield.

2. The assembly according to claim 1, further comprising a coupler being coupled to said front wall of said housing.

3. The assembly according to claim 2, further comprising a receiver being coupled to said first end of said pole, said receiver pivotally engaging said coupler to pivotally retain said pole on said housing.

4. The assembly according to claim 1, further comprising a processor being positioned within said housing, said processor selectively generating an alarm sequence.

5. The assembly according to claim 4, further comprising a speaker being coupled to said front wall of said housing wherein said speaker is configured to emit an audible alarm, said speaker being turned on when said processor generates said alarm sequence.

6. The assembly according to claim 4, further comprising a light emitter being coupled to said front wall of said housing wherein said light emitter is configured to selectively emit light, said light emitter being turned on when said processor generates said alarm sequence.

7. The assembly according to claim 4, further comprising a power supply being positioned within said housing, said power supply being electrically coupled to said processor, said power supply comprising at least one battery.

8. The assembly according to claim 4, further comprising said sensor being electrically coupled to said processor, said processor generating said alarm sequence when said sensor senses said pad abuts the windshield.

9. The assembly according to claim 1, wherein said pad has a first surface and a second surface, said first surface being coupled to said second end of said pole, said second surface being configured to abut the windshield.

10. A parking alarm assembly being configured to communicate when a vehicle is fully positioned in a garage, said parking alarm assembly comprising:

an alarm unit being configured to be coupled to a wall in a garage, said alarm unit selectively emitting an audible alarm, said alarm unit comprising:

a housing having a front wall and a back wall, said back wall being configured to be coupled to the wall, a coupler being coupled to said front wall of said housing, a processor being positioned within said housing, said processor selectively generating an alarm sequence, a speaker being coupled to said front wall of said housing wherein said speaker is configured to emit an audible alarm, said speaker being turned on when said processor generates said alarm sequence, a light emitter being coupled to said front wall of said housing wherein said light emitter is configured to selectively emit light, said light emitter being turned on when said processor generates said alarm sequence, and a power supply being positioned within said housing, said power supply being electrically coupled to said processor, said power supply comprising at least one battery;

a pole being pivotally coupled to said alarm unit wherein said pole is configured to extend between said alarm unit and a windshield of a vehicle being parked in the garage, said pole having a first end and a second end, said first end being coupled to said front wall of said housing and said pole extending forwardly from said front wall wherein said second end of said pole is extended away from said housing, said pole having a plurality of sections being slidably coupled together such that said pole has a telescopically adjustable length;

a receiver being coupled to said first end of said pole, said receiver pivotally engaging said coupler to pivotally retain said pole on said housing;

a pad being coupled to said pole wherein said pad is configured to engage the windshield when the vehicle is parked in the garage, said alarm unit emitting said audible alarm when said pad contacts the windshield wherein said alarm unit is configured to notify a driver of the vehicle to stop, said pad having a first surface and a second surface, said first surface being coupled to said second end of said pole, said second surface being configured to abut the windshield; and a sensor being coupled to said pad wherein said sensor is configured to sense when said pad abuts the windshield, said sensor being electrically coupled to said processor, said processor generating said alarm sequence when said sensor senses said pad abuts the windshield.

\* \* \* \* \*